June 24, 1930.　　　T. C. MILLER　　　1,767,544
COFFEE MAKING APPARATUS
Filed Aug. 8, 1928
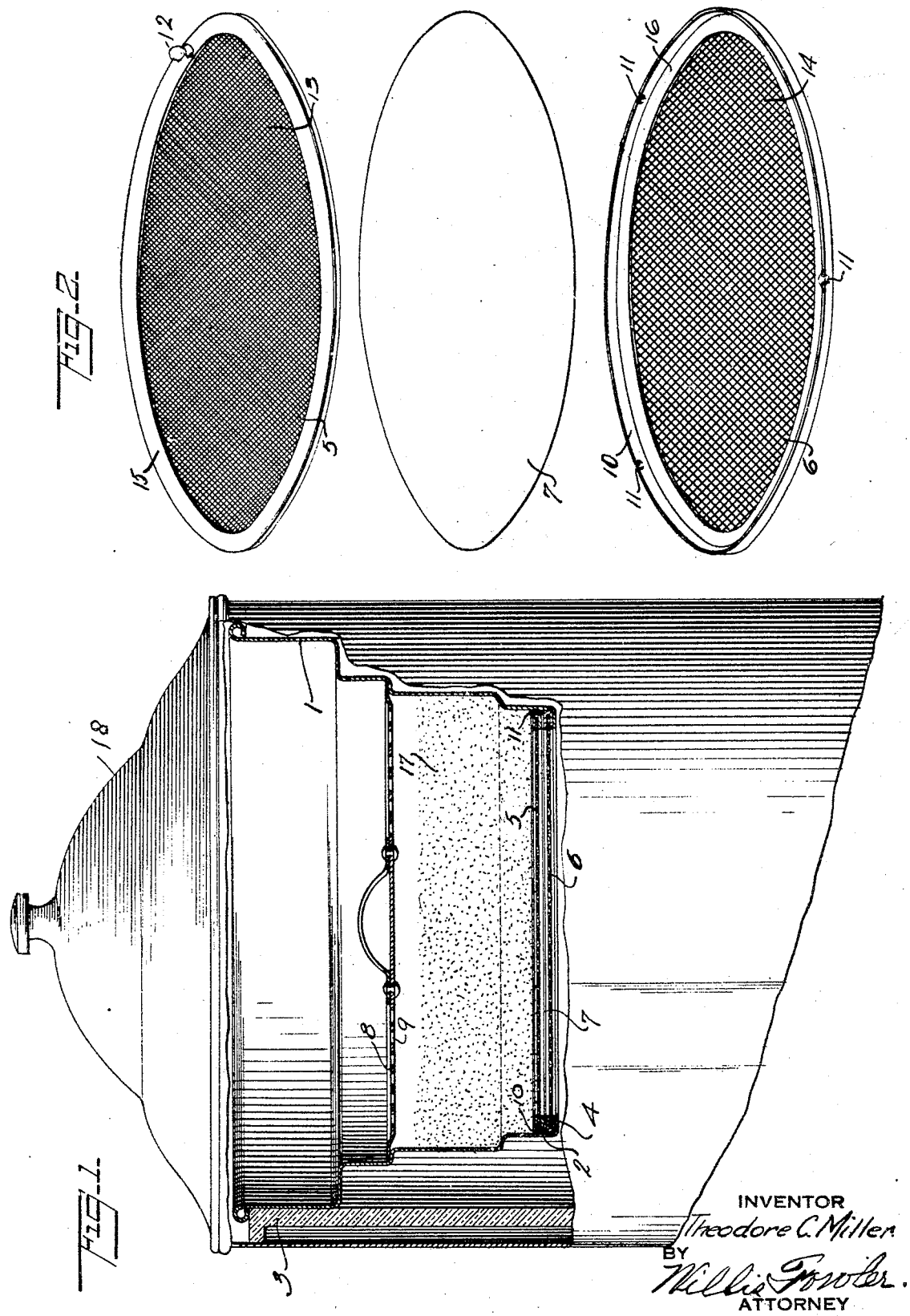
INVENTOR
Theodore C. Miller
BY
Willis Fowler.
ATTORNEY Patented June 24, 1930

1,767,544

UNITED STATES PATENT OFFICE

THEODORE C. MILLER, OF BROOKLYN, NEW YORK

COFFEE-MAKING APPARATUS

Application filed August 8, 1928. Serial No. 298,248.

My invention relates in general to apparatus for making an infusion of coffee and has particular reference to that type in which there is employed a filtering medium for the liquid to percolate through and drip into a receiving vessel from which the finished coffee is drawn for use.

In some of the constructions of this type of apparatus there is used a filtering medium in the form of a sheet of filtering material, which is placed directly upon a perforated bottom of the ground-coffee receptacle or holder. In cases where filter-paper is thus used, it often happens that this receptacle with the filter-paper placed therein is carelessly stood on its bottom on a wet surface before assembling the parts and this causes the dry filter-paper to become prematurely wet, before or after the ground-coffee is deposited thereon, and this results in the filter-paper being so mutilated and broken that the ground-coffee escapes through the paper and finds its way into the liquid-coffee. Again, in cases where the ground-coffee is placed upon the dry filter sheet and the operator proceeds to lift the charged receptacle into place on the top of the usual receiving vessel, the filter-sheet with the superposed loose charge of ground-coffee, shifts out of place on the perforated bottom and thereby uncovers some of the perforations so that the ground-coffee falls therethrough and is either lost or gets into the liquid-coffee when the hot-water is applied. Both of these defects are of a serious nature and are highly objectionable to users of this type of apparatus. One of the principal objects of my present invention is to provide filter means for overcoming the above stated drawbacks. Other objects of my invention will appear from the detailed description hereinafter given.

I have illustrated a type of my invention in the accompanying drawings, wherein:

Figure 1, shows a vertical central section of an apparatus embodying my invention.

Figure 2, shows a perspective view of the parts of the demountable filter means, separated from each other and ready to be assembled into a unit, such as shown in Fig. 1.

Referring to the drawings, 1 is a cylindrical receptacle open at both ends and with the lower part 2, contracted for insertion in the upper end of the ordinary coffee urn or receiver 3, which is shown as broken away below its upper end and into which the finished liquid coffee infusion is deposited to be drawn off in the usual way by a faucet, which is not shown.

The interior of the lower end of the receptacle 1, is provided with a shoulder or flange 4, which serves as a support for my improved detachable filter means, which comprises upper and lower perforated circular members 5 and 6, respectively, between which is placed and held a filter sheet 7, covering the perforations and which may be of any suitable filtering material, such as ordinary filter paper or fabric. This perforated holder or box is of a diameter to fit snugly within the lower end of the receptacle 1 and rest upon the flange 4. This filtering device is inserted by hand with a fresh dry filter sheet when the infusion is to be made and the dry ground-coffee is then placed upon its upper side, and the boiling water is poured into the upper end of the receptacle upon the spreader plate 8, having perforations 9, therein through which the hot water is showered upon the charge of ground-coffee resting upon the filter means.

The lower filter plate 6, is provided with a vertical marginal flange 10, into which fits the upper plate 5, and the latter is locked thereto by having its edge snapped over domes or projections 11, 11, on said flange. The upper plate 5, is provided with a knob 12, which is grasped by the hand to separate the two plates when the filter paper is to be removed and a fresh one inserted.

I find that by using wire mesh or gauze 13 and 14, for the respective plates, instead of perforated metal sheets, that quicker and better action of the liquid passing into and through the ground-coffee 17, is obtained. The mesh of the upper screen 5, is preferably of a finer mesh than that of the lower one, as indicated in the drawings, and the wire is made of rustless metal, such as Monel metal, and the screens are provided with marginal metal frames 15 and 16, respectively, so as to make them more durable and easy to manipulate. The size of the mesh for the lower screen should be such as not cause the filter paper to be pressed through the openings therein when the charge of ground coffee is wet and undergoing the filtration operation. By making the openings of the upper screen relatively small, a desirable degree of impediment is given the boiling-water which floods the screen and this may be regulated as desired.

The filter plates 5 and 6, are arranged so as to lie substantially in contact with each other so that when a filter sheet 7, is placed between them, it is clamped securely in operative position. When a new filter sheet is to be put in place, the screen plates are pulled apart and the old filter sheet removed and after drying the plates and cleaning them a fresh dry filter sheet is then inserted and the plates closed on each other. The urn is provided with the usual removable cover 18, for closing the same.

The device thus constructed is a unitary one that can be readily manipulated and quickly mounted in place and also demounted and the filter sheet renewed, with practically no danger of the filter paper getting wet before the hot water is applied and the filter sheet is prevented from shifting out of place after receiving the charge of ground-coffee 17. A set of these devices for each coffee making urn may be kept on hand with fresh filter sheets fixed in them ready for immediate use when a new charge of ground-coffee is to be put in the apparatus for a fresh batch of coffee infusion. This scheme also saves considerable time in recharging the apparatus with ground-coffee, as it is not necessary to delay the operation by the usual cleaning of the filter means and replacement of a clean filter sheet. In case one of the filter plates becomes damaged, the device is but partially impaired and requires but the replacement of such part and not a replacement of the whole structure, as in some constructions.

I wish to be understood as not limiting my invention to the specific construction of the various different parts thereof as herein shown, as it is manifest that changes may be made in the same, without, however, departing from the spirit of my invention.

Having thus described my invention, what I claim and desire to secure by Letters Patent, is:

1. In a coffee making apparatus, the combination with a liquid receiving receptacle, of a detachable filter device comprising a pair of superposable screens one of which is provided with a marginal flange for receiving the periphery of the other in nesting relation, and a filter sheet removably inserted between said screens, said combined screens and filter-sheet being insertable in and removable from said apparatus as a unitary structure.

2. In a coffee making apparatus, the combination with a liquid receiving receptacle, of a detachable filter device comprising a pair of juxtaposable screens composed of wire mesh provided with substantially rigid marginal frames and a filter sheet removably inserted between said screens, the frames of said screens being provided with releasable snap fastening device for securing the screens together in operative positions.

Signed at New York city in the county of New York and State of New York this 31st day of July, 1928.

THEODORE C. MILLER.